(12) United States Patent
Block et al.

(10) Patent No.: US 6,271,978 B1
(45) Date of Patent: *Aug. 7, 2001

(54) POWER EFFICIENT OVERSHOOT CONTROL FOR MAGNETIC RECORDING WRITE DRIVER

(75) Inventors: David J. Block, Pleasanton; Timothy G. Moran, San Jose, both of CA (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,704

(22) Filed: May 7, 1999

(51) Int. Cl.[7] ........................................................ G11B 5/09

(52) U.S. Cl. .................................................. 360/46; 360/68
(58) Field of Search ................................... 360/46, 61, 68

(56) References Cited

U.S. PATENT DOCUMENTS

| | | | |
|---|---|---|---|
| 5,168,395 | * 12/1992 | Klaassen et al. | 360/46 |
| 5,757,215 | * 5/1998 | Schuelke et al. | 360/46 |
| 5,790,331 | * 8/1998 | Aranovsky | 360/46 |
| 5,822,141 | * 10/1998 | Chung et al. | 360/68 |

* cited by examiner

*Primary Examiner*—Alan T. Faber
(74) *Attorney, Agent, or Firm*—W. Daniel Swayze, Jr.; W. James Brady; Frederick J. Telecky, Jr.

(57) ABSTRACT

A circuit for a write driver including a blanking circuit to output a blanking signal to interrupt a current path. The current path is for first and second currents used to drive an inductive load in an H-bridge circuit. The blanking signal may be delayed by a programmable amount.

7 Claims, 7 Drawing Sheets

POWER EFFICIENT OVERSHOOT CONTROL FOR MAGNETIC RECORDING WRITE DRIVER

FIELD OF THE INVENTION

The present invention relates to write drivers for an inductive head in a magnetic data storage system and more particularly to write drivers that include a blanking circuit connected to an H-bridge circuit to drive the head.

BACKGROUND OF THE INVENTION

Conventional storage systems include an inductive head that uses an inductive element to write information onto a recording surface of the magnetic medium, such as a magnetic disk. The inductive element usually includes an inductive coil that writes information by creating a changing magnetic field near the magnetic medium. A write driver circuit is connected to the magnetic head at two head terminals. During writing operations, the write driver circuit forces a relatively large write current through the inductive coil to create a magnetic field that polarizes adjacent bit positions on the recording surface. Digital information is stored by reversing the polarization of selected bit positions which is done by reversing the direction of the current flow in the inductive coil.

The typical write driver circuit includes an "H-bridge" for controlling the direction of current flow through the inductive coil. The H-bridge includes upper "pull-up" bipolar transistors and lower "pull-down" bipolar transistors. The upper bipolar transistors are connected between a first supply voltage and the head contacts or terminals. The lower bipolar transistors are connected between the head terminals and a second supply voltage through a write current sink. The write driver circuit controls the direction of current flow through the inductive coil by driving selected transistors in the H-bridge between ON and OFF states.

The rate at which information can be stored on a recording surface through an inductive head is directly proportional to the rate at which the direction of current can be reversed in the inductive coil. The rise/fall time of the inductive coil is approximately:

$$di/dt = V/L$$

where $di/dt$ is the rate of change of the current over time across the inductive coil, $V$ is the available voltage across the inductive coil, and $L$ is the inductive load. Therefore, the speed of the H-bridge is directly proportional to the available voltage across the inductive coil. The available voltage is determined by subtracting the voltage drops across the pull-up transistors, the pull-down transistors, and the write current sink from the supply voltage.

The write circuit is a portion of a preamplifier system. The preamplifier system also includes a read circuit which, together with the write circuit, reads and writes information to and from the magnetic medium.

A preamplifier system is connected to the magnetic head coil at the head contacts.

The lower switches of the H-bridge are generally controlled by FET transistors. These transistors are formed by a CMOS process.

FIG. 2 illustrates the overshoot and ringing effects on the head current versus bit times between transitions. FIG. 2 illustrates the effect of overshoot by the fact that the head current rises to over 80 milliamps when a steady state value of 50 milliamps is desired. Thus, the overshoot is over 30 milliamps. Further, FIG. 2 illustrates the effects of ringing through four different bit times. Each bit time represents a period of time when another transition on the disk could be written. The ringing is the dampened sinusoidal effect after the first bit time. FIG. 1 illustrates a graph of head current versus time and the associated jitter resulting from a transition being written at a bit time. Depending on the initial head current, a different zero crossing time is achieved. Thus, the jitter is caused by write transitions beginning at current values that depart from the desired head current. Assuming the rise and fall times to be constant, transitions beginning at different values of the head current will cross the slicing threshold at different points in time, resulting in the jitter illustrated in FIG. 1. Thus, when a waveform has significant overshoot and ringing, the head current is varying significantly with time. If the overshoot and ringing are kept to a minimum, the waveform values will vary less over time, resulting in reduced jitter.

Overshoot can be explained more fully with respect to the idealized model of a head current illustrated in FIG. 9. In FIG. 9, a resistor 902 represents the resistance associated with the coil in the head. The inductor 904 corresponds to the inductance of the coil. The capacitor 906 is associated with the capacitance found in a disk drive system that affects the head circuit. Typically, the preamplifier is mounted on a flex which includes long lines to the head. The current generator 908 generates current that is introduced into the H-bridge across the head. As the current is first sourced into the head, the current flows into capacitor 906 to build a voltage across the head; the current in L cannot change instantaneously. The inductor current then begins to build due to the voltage across it according to the equation $$di = \frac{V}{L} dt.$$

The voltage across the head continues to build until the inductor current reaches the desired value. The voltage that remains across the head causes the inductor current to continue to build to a value in excess of the desired current, resulting in overshoot. As discussed previously, the overshoot is significantly large and is undesirable.

SUMMARY OF THE INVENTION

The present invention controls the overshoot of the head current. The overshoot of the head current is controlled by momentarily reducing the current sourced by the H-bridge below the desired current at about the time the inductor current reaches its desired value so that the entire inductor current can be used to quickly return the current voltage to its final level, eliminating the overshoot of the head current. The present invention uses a current blanking pulse in order to reduce the desired current. Additionally, the current blanking pulse may be delayed from the time of the transition. Additionally, the delay may be varied in order to optimize the effect of the overshoot. This delay is programmable so that the user can program the delay by a digital signal.

DETAILED DESCRIPTION OF THE PRESENT INVENTION

The following invention is described with reference to the figures in which similar or the same numbers represent the same or similar elements. While this invention is described in terms for achieving the invention's objectives, it can be appreciated by those skilled in the art that variations may be accomplished in view of these teachings without deviation from the spirit or scope of the invention.

Figure 13:
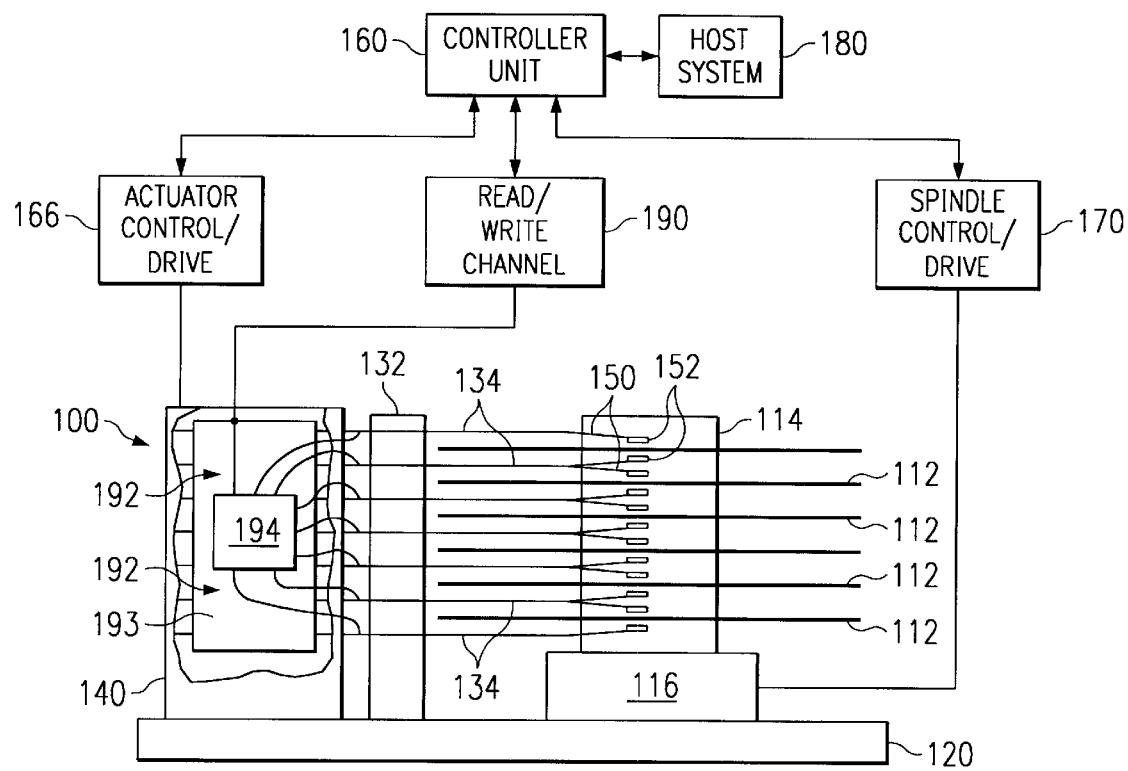
FIG. 13 illustrates a side view of a system.
Figure 14:
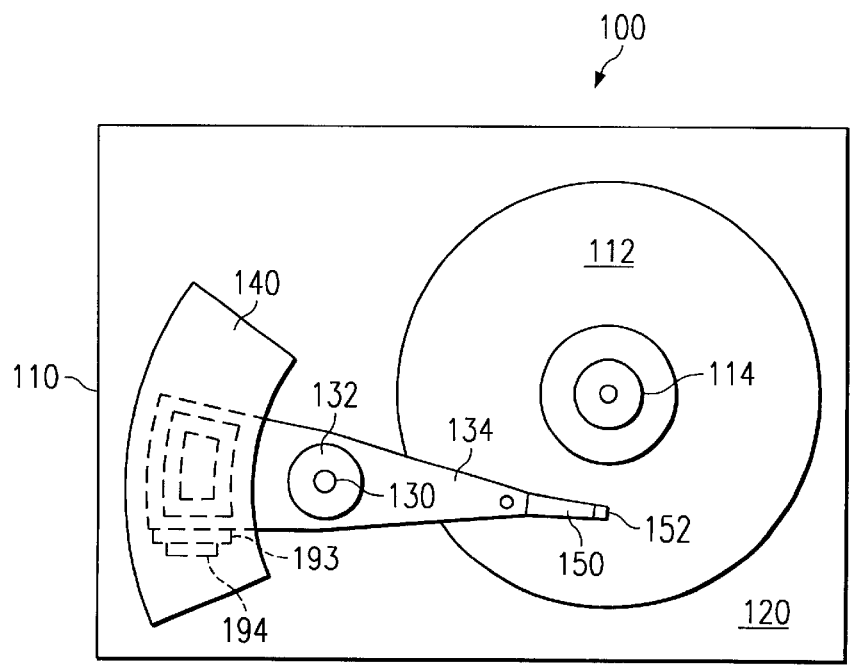
FIG. 14 illustrates a top view of the system.

FIGS. 13 and 14 show a side and top view, respectively, of the disk drive system designated by the general reference 100 within an enclosure 110. The disk drive system 100 includes a plurality of stacked magnetic recording disks 112 mounted to a spindle 114. The disks 112 may be conventional particulate or thin film recording disk or, in other embodiments, they may be liquid-bearing disks. The spindle 114 is attached to a spindle motor 116 which rotates the spindle 114 and disks 112. A chassis 120 is connected to the enclosure 110, providing stable mechanical support for the disk drive system. The spindle motor 116 and the actuator shaft 130 are attached to the chassis 120. A hub assembly 132 rotates about the actuator shaft 130 and supports a plurality of actuator arms 134. The stack of actuator arms 134 is sometimes referred to as a "comb." A rotary voice coil motor 140 is attached to chassis 120 and to a rear portion of the actuator arms 134.

A plurality of head suspension assemblies 150 are attached to the actuator arms 134. A plurality of inductive transducer heads 152 are attached respectively to the suspension assemblies 150, each head 152 including at least one inductive write element. In addition thereto, each head 152 may also include an inductive read element or a MR (magneto-resistive) read element. The heads 152 are positioned proximate to the disks 112 by the suspension assemblies 150 so that during operation, the heads are in electromagnetic communication with the disks 112. The rotary voice coil motor 140 rotates the actuator arms 134 about the actuator shaft 130 in order to move the head suspension assemblies 150 to the desired radial position on disks 112.

A controller unit 160 provides overall control to the disk drive system 100, including rotation control of the disks 112 and position control of the heads 152. The controller unit 160 typically includes (not shown) a central processing unit (CPU), a memory unit and other digital circuitry, although it should be apparent that these aspects could also be enabled as hardware logic by one skilled in the computer arts. Controller unit 160 is connected to the actuator control/drive unit 166 which is in turn connected to the rotary voice coil motor 140. A host system 180, typically a computer system or personal computer (PC), is connected to the controller unit 160. The host system 180 may send digital data to the controller unit 160 to be stored on the disks, or it may request that digital data at a specified location be read from the disks 112 and sent back to the host system 180. A read/write channel 190 is coupled to receive and condition read and write signals generated by the controller unit 160 and communicate them to an arm electronics (AE) unit shown generally at 192 through a cut-away portion of the voice coil motor 140. The AE unit 192 includes a printed circuit board 193, or a flexible carrier, mounted on the actuator arms 134 or in close proximity thereto, and an AE module 194 mounted on the printed circuit board 193 or carrier that comprises circuitry preferably implemented in an integrated circuit (IC) chip including read drivers, write drivers, and associated control circuitry. The AE module 194 is coupled via connections in the printed circuit board to the read/write channel 190 and also to each read head and each write head in the plurality of heads 152. The AE module 194 includes the write circuit of the present invention.

Figure 1:
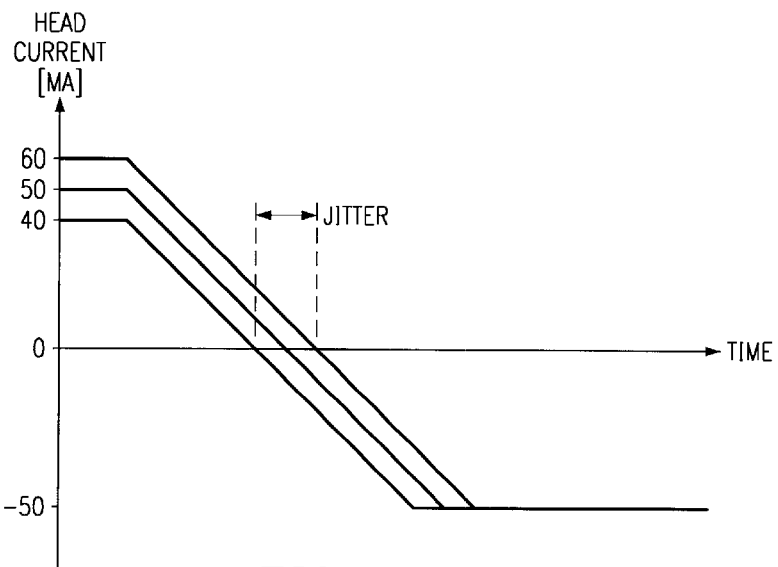
FIG. 1 illustrates a diagram of initial current value versus jitter.
Figure 2:
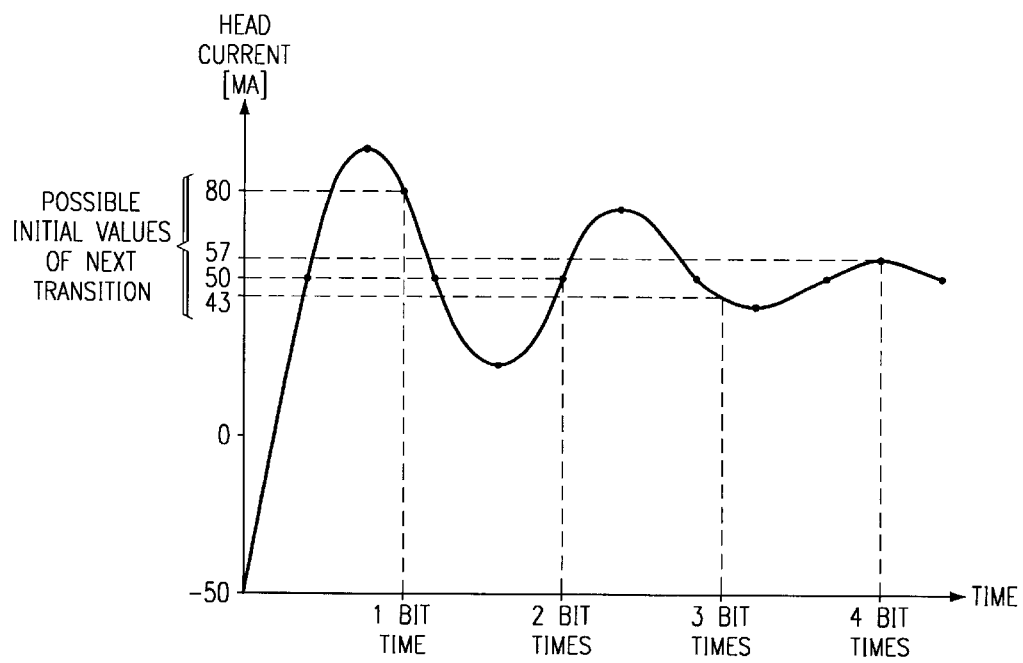
FIG. 2 illustrates overshoot and ringing effect.
Figure 3A:
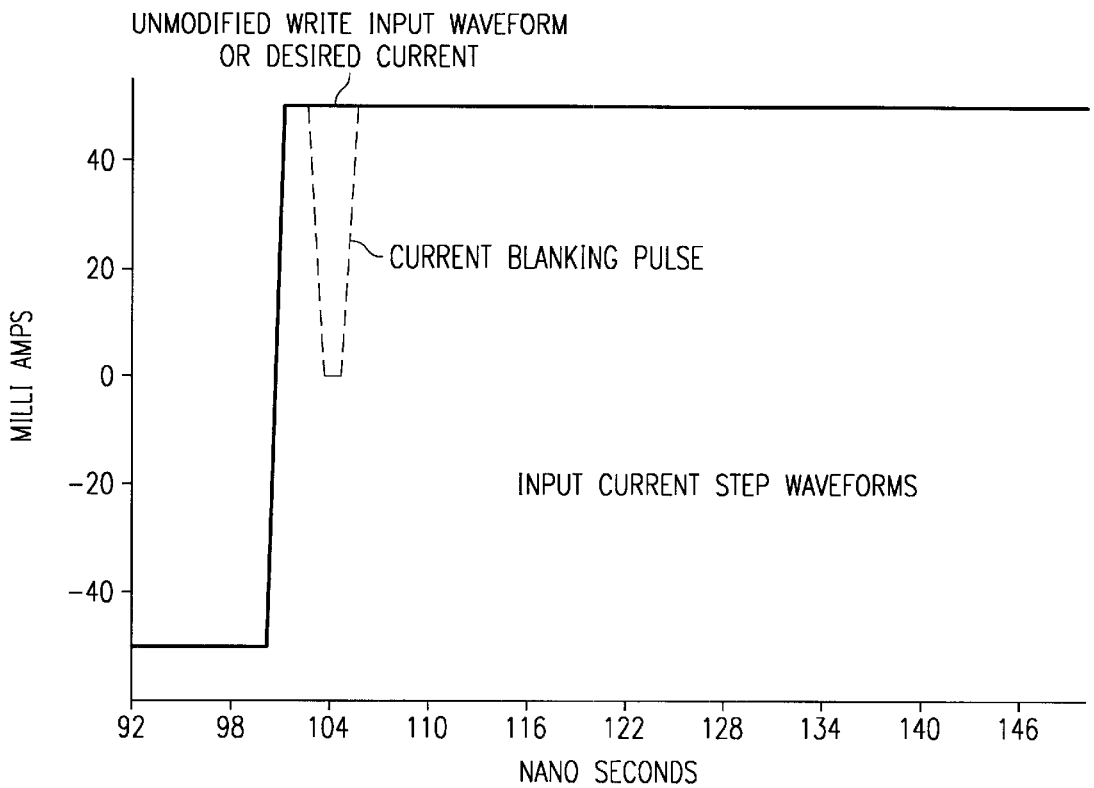
FIG. 3a illustrates write current waveforms.

The present invention provides a write driver that eliminates or minimizes the overshoot that results from interaction between the inductance and capacitance of the write head, flex circuit and other sources. The present invention uses a current elimination circuit to temporarily eliminate desired current from a current source to be replaced with current generated from a capacitance-induced voltage across an inductor. With the current elimination circuit eliminating current with the net result being the current supplied to the head remains level or unchanged. Reducing the amount of current fed to the head by the blanking pulse generator 460 causes the capacitor 472 to supply sufficient current to the head to maintain a level supply of current. This reduces the voltage across the capacitor very quickly, eliminating or reducing the current overshoot. As illustrated in FIG. 3a, the current is initially at a low level, and at approximately 10 nanoseconds, when a write transition is to be recorded on the disk, the input current rises steeply to an unmodified write input waveform or a desired current. For a short period of time, or approximately to 0.2 nanoseconds, the input write current remains at the desired current level. At approximately 0.2 nanoseconds from the beginning of the input write current, a current blanking pulse is initiated, reducing the input write current that is input to the head. This blanking pulse is sufficient in magnitude to eliminate the overshoot caused by the current from the capacitor. At approximately 10.5 nanoseconds, the current blanking pulse is eliminated, and the input write current supplied to the inductor again rises to the desired current level. At this point, the overshoot has been eliminated.

Figure 3B:
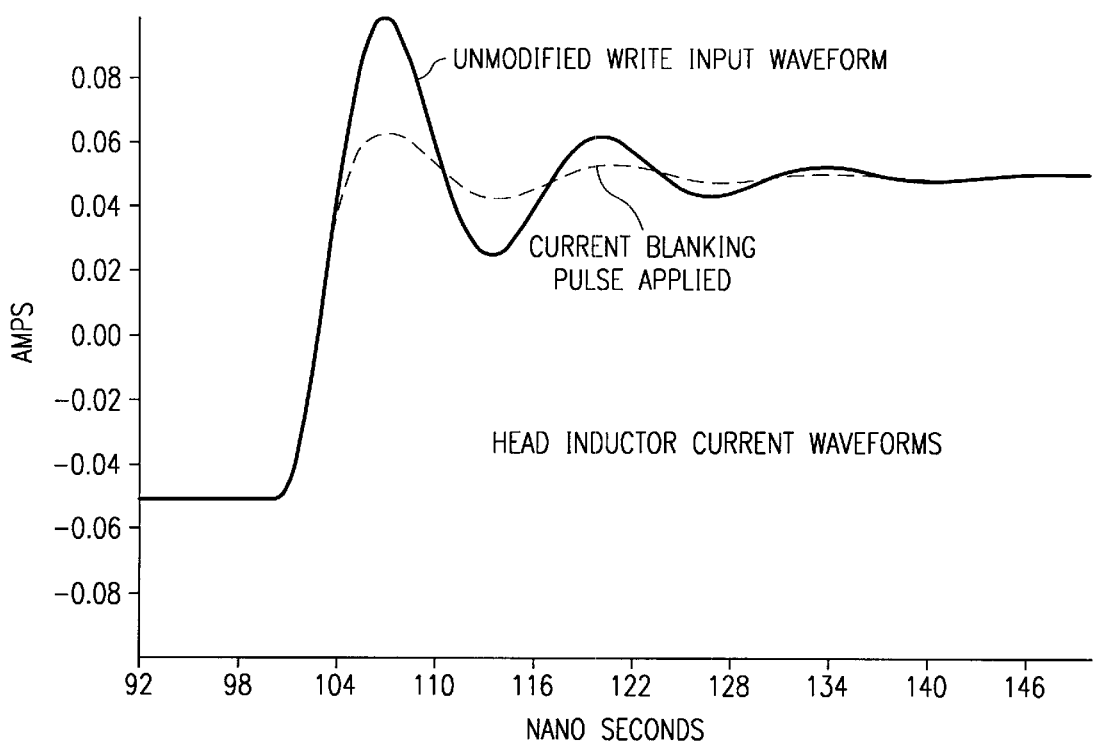
FIG. 3b illustrates head inductor current waveforms.
Figure 4:
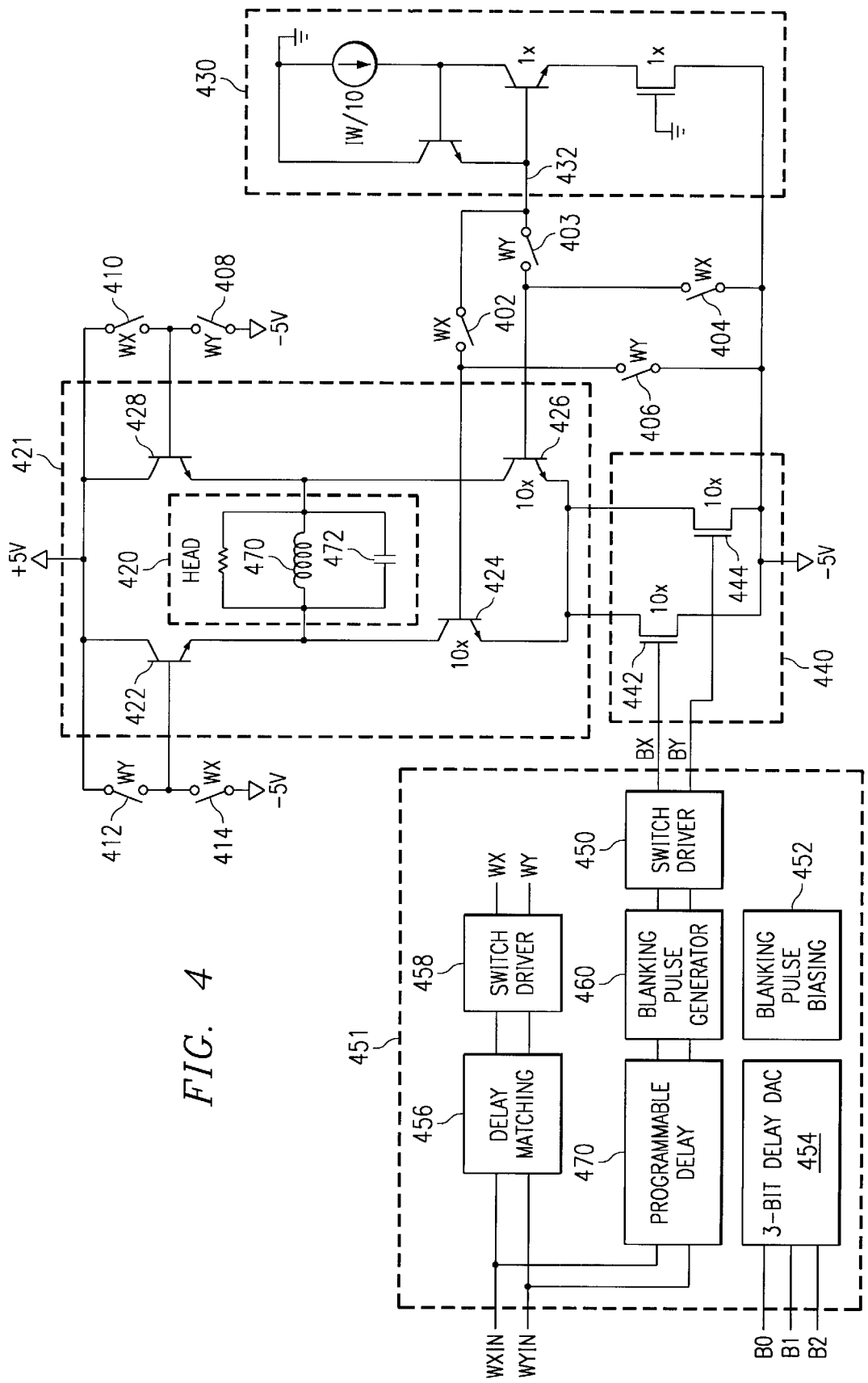
FIG. 4 illustrates a block diagram of a write driver circuit.

In FIG. 3b, a head inductor current waveform with and without overshoot is illustrated. This current is the total current; the sum of the input write current and the current from the capacitor. As can be very clearly seen, the current with the blanking pulse applied has almost no overshoot. As compared with the unmodified write input waveform, the overshoot is significantly higher when the current blanking pulse is not applied. FIG. 4 illustrates a block diagram of a write driver with overshoot control. FIG. 4 illustrates a current mirror circuit 430 to supply a current IW to H-bridge circuit 421. The current supplied to the H-bridge circuit 421 is controlled by a blanking switching circuit 440. The blanking switching circuit 440 is controlled by a blanking control circuit 451. The blanking switching circuit 440 eliminates the input write current by eliminating the path to ground during the time period of the blanking pulse. The current mirror circuit 430 supplies current to node 432. Connected to node 432 are switches 402 and 403. The switches 402 and 403 are controlled by write control circuit signals WX and WY. Switch 404 is connected to the base of transistor 426 to turn off transistor 426 when write control signal WX is received. Switch 403 is connected to node 432 and to the base of transistor 426 to feed the current from the current mirror circuit 430 to turn on transistor 426 when the write control signal WY is received. Switch 406 is connected to the base of transistor 424 to turn off transistor 424 whenever the write control signal WY is received. Additionally, switch 402 is connected to node 432 and to the base of transistor 424 to turn on transistor 424 whenever the write control signal WX is applied. Switch 408 is connected to −5 volts and to the base of transistor 428. This switch turns off transistor 428 whenever the write control signal WY is received. Switch 410 is connected to the base of transistor 428 and to the supply voltage +5 volts to turn on transistor 428 whenever the write control signal WX is received. Likewise, the switch 412 is connected to the supply voltage +5 volts and to the base of transistor 422 to turn on transistor 422 when the write control signal WY is received. Switch 414 is connected to the base of transistor 422 and to the −5 volt supply to turn off transistor 422 whenever the write control signal WX is received.

In operation, when the write signal WX is received, transistor 422 is turned off by virtue of the fact that it is connected to −5volts through switch 414. Additionally, transistor 428 is turned on when the write control signal WX is received by virtue of the fact that switch 410 is connected to the source supply voltage +5volts. Likewise, transistor 426 is turned off by virtue of switch 404 which is connected to −5 volts. Transistor 424 is turned on by virtue of switch 402 which is connected to node 432. The collector of transistor 428 is connected to the supply voltage +5 volts. The emitter of transistor 428 is connected to the head circuit 420. The collector of transistor 426 is connected to the head circuit 420. The emitter of transistor 426 is connected to the emitter of transistor 424. The collector of transistor 424 is connected to the head circuit 420. Current flows from the supply voltage to the collector of transistor 428, through transistor 428 to the emitter of transistor 428. From the emitter of transistor 428, the current flows through the emitter of transistor 424. From the emitter of transistor 424, current flows to −5 volts through FET 442 or FET 444. Switches 422 and 444 remain open for a period of time set by the programmable delay circuit 470. The period of time corresponds to the duration of the blanking pulse output from the blanking pulse generator 460. The programmable delay circuit 470 is controlled by the 3-bit delay DAC 454. Although a 3-bit delay DAC is illustrated, any bit delay DAC could be used. The delay DAC 454 converts the digital signal input on input lines to an analog signal output to the programmable delay circuit 470. The programmable delay circuit 470 delays the input signal to the programmable delay circuit 470 by the programmed delay. After the delay time set by the programmable delay circuit 470, the delayed input signal is input to the blanking pulse generator 460. The blanking pulse generator 460 generates a blanking pulse signal which is input to the switch driver 450 in response to receiving the delayed input signal. The switch driver 450 controls FET 442 and FET 444 to turn off FET 442 and FET 444 during a current blanking pulse such that the current flow through the head circuit 420 is interrupted for the current blanking pulse. As described, transistors 428 and 424 are on, and FET 442 is on to provide a current path through transistor 428, through head circuit 420, through transistor 424, and through FET 442.

As current flows through head circuit 420, initially no current flows through inductor 471. The current flows through capacitor 472 which results in a voltage building across capacitor 422. Eventually, current flows through inductor 471 and through capacitor 472. When the current reaches a desired level set by the input to the head circuit 420, the delay circuit 470 keeps FET 442 on so that current flows through the head circuit 420. After the delay, the blanking pulse generator 460, after receiving the delayed input signal from the delay circuit 470, activates the switch driver 450 which in turn turns FETs 442 and 444 off. This eliminates the current flowing through transistor 424. However, as a result of the voltage formed on capacitor 422, the current continues to flow through inductor 471. As the current flows, the voltage on capacitor 472 is reduced. After a period of time, the blanking pulse generator 460 terminates the generation of the blanking pulse and terminates the activation of the switch driver 460. In response, the switch FET 444 turns on to provide a current path, allowing current to flow through transistor 428 through head 420 and through transistor 424.

Figure 5:
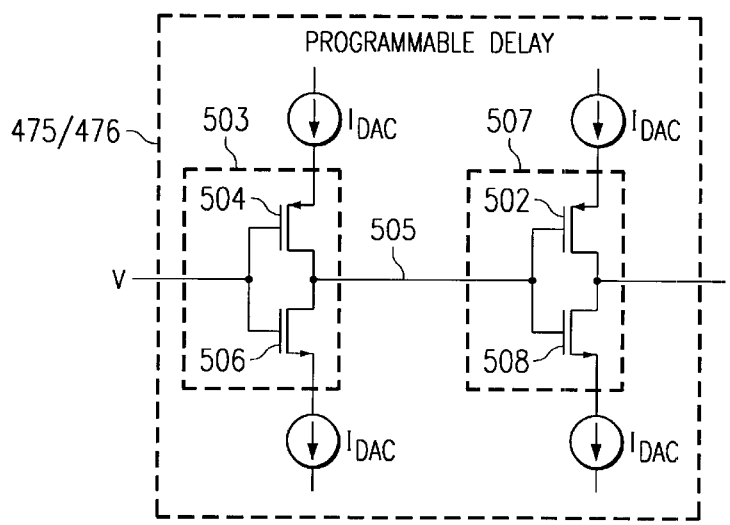
FIG. 5 illustrates a programmable delay circuit.
Figure 6:
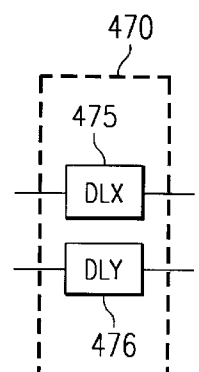
FIG. 6 illustrates a pair of programmable delay circuits.

FIG. 5 illustrates a possible implementation of the programmable delay circuit 470. The programmable delay circuit 470 shown in FIG. 6 includes two programmable delay circuits illustrated in FIG. 5. One circuit delays the WX signal while the other delays the WY signal. FIG. 5 illustrates two stages, the first stage 505 and the second stage 507. The combination of the first stage 505 and the second stage 507 is used to eliminate variation between the NFET and the PFET transistors. Regardless of which current path is active, each current path will have an NFET and a PFET. Since the input to the programmable delay circuit 475 is opposite in phase to the input to programmable delay circuit 476, the speed through the programmable delay circuit 475 must equal the speed through programmable delay circuit 476. To accomplish this, the first stage 405 and the second stage 407 are employed. The delay of programmable delay circuit 475 is based on the current $I_{DAC}$ from the delay DAC 454. The lower the $I_{DAC}$ current is, the slower the transitions between either high to low or low to high. This transition time is the amount of delay that the programmable delay circuit 475 delays the input signal. The current at the node 505 between PFET 504 and NFET 506 and the capacitance associated with the node 505 determines the time from a low to high voltage, the transition time. When the first stage 505 goes from high to low, the NFET 506 is turned on. The low voltage at the node 505 between PFET 504 and NFET 506 is low which turns on the PFET 502. Thus, the output of the second stage provides a programmable delayed signal. Likewise, if the signal input to the first stage was high to low, this signal would turn on PFET 504 in the first stage, and the high signal at node 505 between PFET 504 and NFET 506 would turn on the NFET 508. On each occasion, one NFET is turned on and one PFET is turned on. Thus, there is a balance in the number of PFETs and NFETs.

Figure 7:
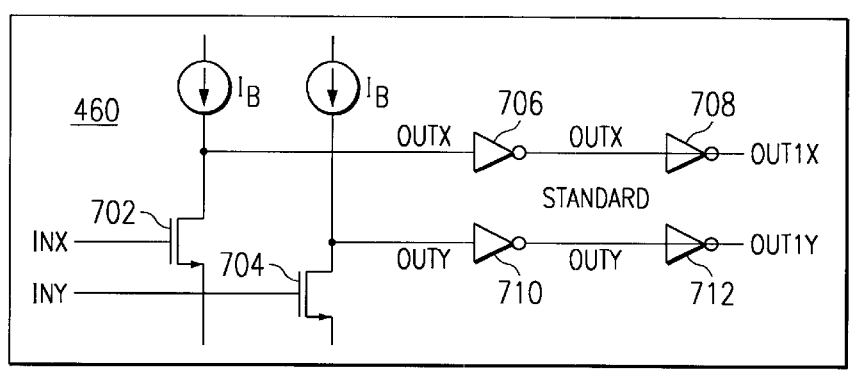
FIG. 7 illustrates a blanking pulse generator.
Figure 8:
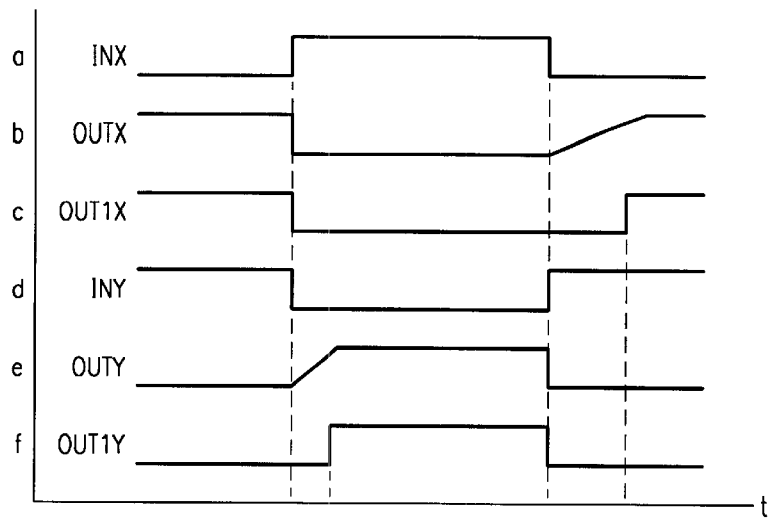
FIG. 8 illustrates the waveforms from a blanking pulse generator.
Figure 9:
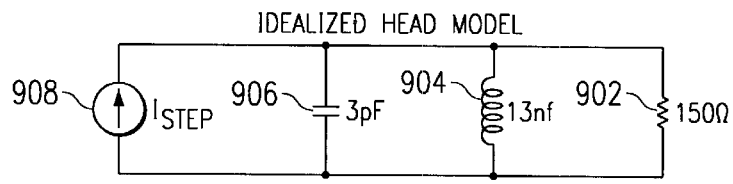
FIG. 9 illustrates an idealized head circuit.

FIG. 7 illustrates the blanking pulse generator 460. FIG. 8 illustrates the input and output signals for the blanking pulse generator 460. FIG. 8a illustrates the input signal INX to NFET 702. This NFET 702 transitions quickly to turn on since the signal INX is a rising pulse. Thus, the output signal of the blanking pulse generator 460, which is the inverse, falls quickly; however, when a falling signal is input to NFET 702, the output signal rises slowly. The inverter 708, which outputs signal 1X, sharpens the slowly rising output signal. Likewise, the falling signal of INY is received by NFET 704, the falling signal is slow to rise as illustrated by signal OUTY. But when the input signal INY has a rising edge, the NFET 704 switches quickly to produce a sharp curve in a similar fashion to NFET 702.

Figure 10:
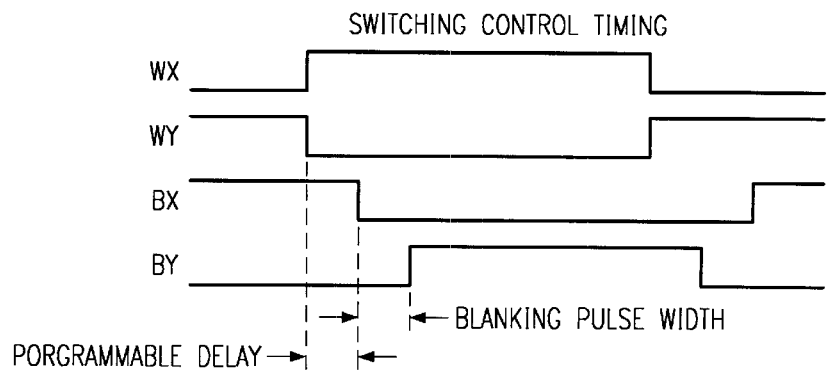
FIG. 10 illustrates switch control timing waveform.

FIG. 10 illustrates the write control signal WX and WY and the control signals BX and BY to control NFET 422 and NFET 444. It shows this signal being delayed as well as the blanking pulse signal pulse width.

Figure 11:
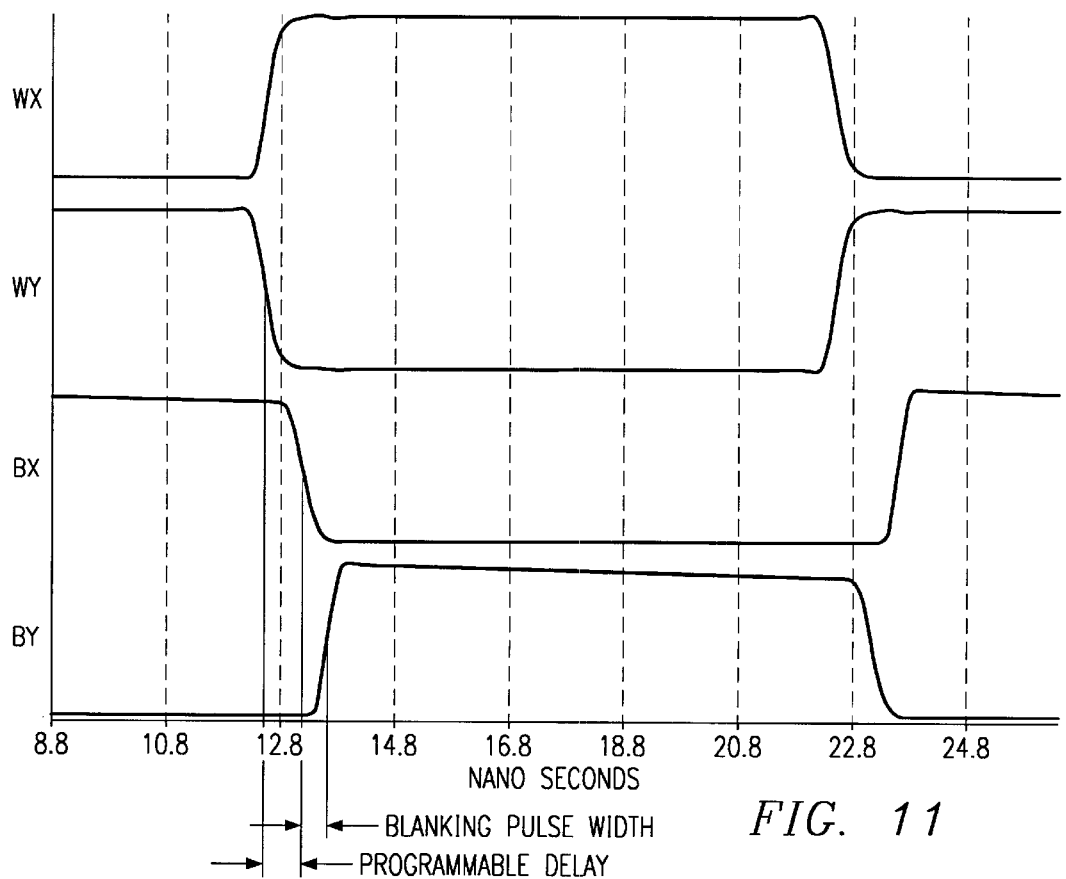
FIG. 11 illustrates write and blanking pulse waveforms.
Figure 12:
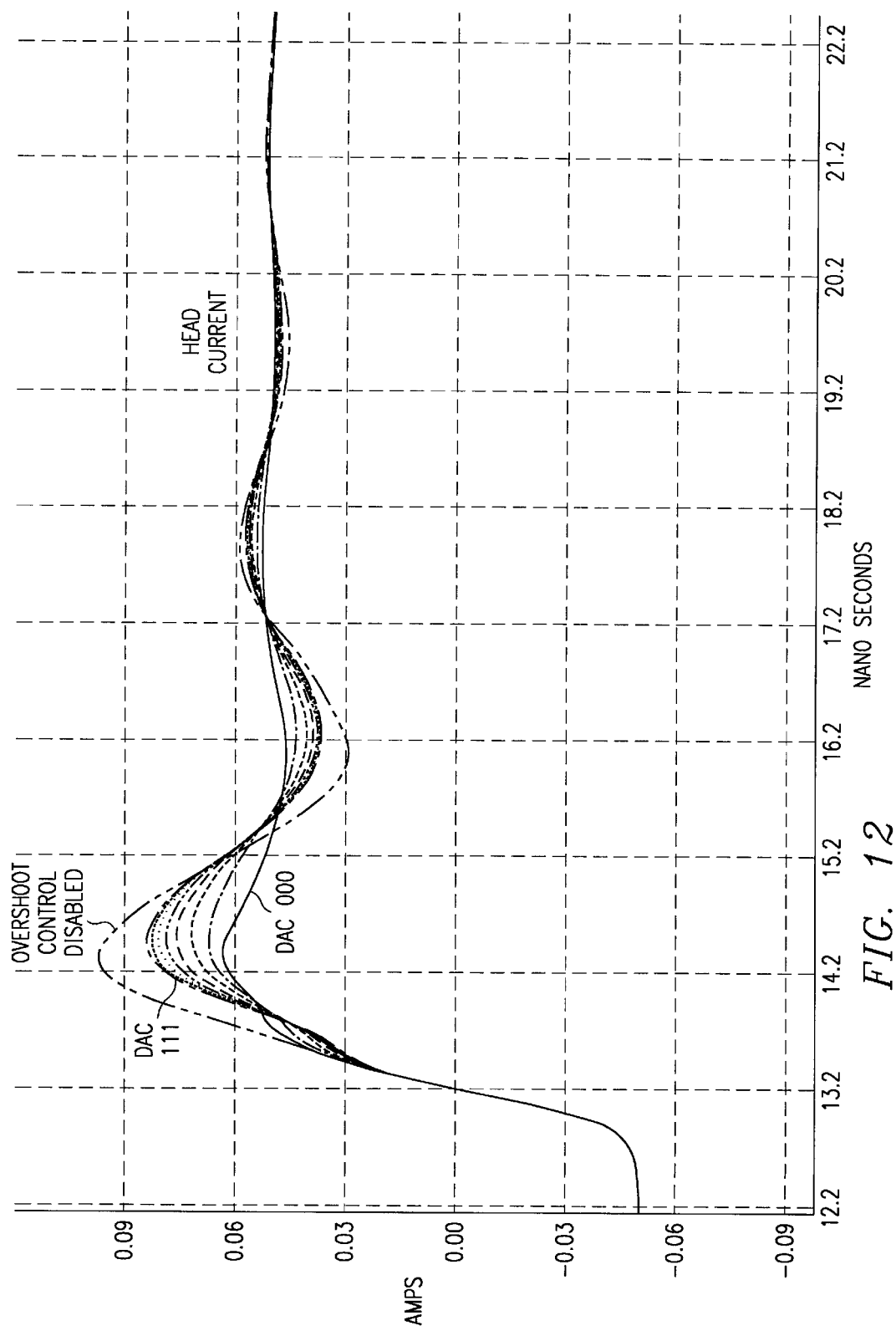
FIG. 12 illustrates overshoot control simulated performance.

FIG. 11 shows typical write and blanking pulse waveforms. FIG. 12 shows overshoot control simulated performance for differing DAC values. The smallest amount of overshoot is achieved by DAC input signals of 000, and the largest amount of overshoot is achieved with a DAC signal of 111.

What is claimed is:

1. A circuit for eliminating overshoot from a write signal, comprising:
   an H-bridge circuit to switch between a first current and a second current to a load;
   a switch circuit directly connected to said H-bridge circuit to form a switchable current path for said first current and said second current; and
   a blanking circuit to control said switch circuit by outputting a blanking signal to correspond to the period of time said switch circuit interrupts said current path for said first and said second current,
   wherein said blanking circuit includes a delay circuit to delay said blanking signal.

2. A circuit for eliminating overshoot from a write signal as in claim 1, wherein said delay circuit is programmable.

3. A circuit for eliminating overshoot from a write signal as in claim 2, wherein said delay circuit includes a programmable DAC.

4. A system for a disk drive, comprising:
   a write/read circuit to write and read data to a disk;
   a preamplifier for amplifying said data read from disk;
   a read/write channel to condition said data read and written to disk; and
   a controller connected to said read/write channel to communicate said data with a host system,
   wherein said write/read circuit comprises:
      a circuit for eliminating overshoot from a write signal, comprising:
         an H-bridge circuit to switch between a first current and a second current to a load;
         a switch circuit directly connected to said H-bridge circuit to form a switchable current path for said first current and said second current; and
         a blanking circuit to control said switch circuit by outputting a blanking signal to correspond to the period of time said switch circuit interrupts said current path for said first and said second current,
         wherein said blanking circuit includes a delay circuit to delay said blanking signal.

5. A system for a disk drive as in claim 4, wherein said delay circuit is programmable.

6. A system for a disk drive as in claim 5, wherein said delay circuit includes a programmable DAC.

7. A method for eliminating overshoot from a write signal, comprising the steps of:
   switching between a first current and a second current to a load with a H-bridge circuit;
   forming a current path directly connected to said H-bridge circuit for said first current and said second current;
   controlling said switching of said first and said second current with a blanking signal; and
   interrupting said current path during a period of time corresponding to said blanking signal,
   wherein said interrupting step includes the step of delaying said blanking signal.

* * * * *